(12) United States Patent
Borkum

(10) Patent No.: US 11,144,523 B2
(45) Date of Patent: Oct. 12, 2021

(54) METHODS AND DATA STRUCTURES FOR EFFICIENT CROSS-REFERENCING OF PHYSICAL-ASSET SPATIAL IDENTIFIERS

(71) Applicant: BATTELLE MEMORIAL INSTITUTE, Richland, WA (US)

(72) Inventor: Mark I. Borkum, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 226 days.

(21) Appl. No.: 16/371,853

(22) Filed: Apr. 1, 2019

(65) Prior Publication Data

US 2020/0034344 A1 Jan. 30, 2020

Related U.S. Application Data

(63) Continuation-in-part of application No. 16/191,829, filed on Nov. 15, 2018.

(60) Provisional application No. 62/587,611, filed on Nov. 17, 2017.

(51) Int. Cl.
*G06F 16/22* (2019.01)

(52) U.S. Cl.
CPC ...... *G06F 16/2246* (2019.01); *G06F 16/2264* (2019.01)

(58) Field of Classification Search
CPC .... G06F 16/29; G06F 16/2264; G06F 16/909; G06F 30/00
See application file for complete search history.

(56) References Cited

U.S. PATENT DOCUMENTS

| | | | | |
|---|---|---|---|---|
| 9,767,613 | B1* | 9/2017 | Bedikian | G06F 3/04845 |
| 2006/0257005 | A1* | 11/2006 | Bergeron | G01V 5/0016 |
| | | | | 382/103 |
| 2010/0111396 | A1* | 5/2010 | Boucheron | G06K 9/6231 |
| | | | | 382/133 |
| 2012/0290950 | A1* | 11/2012 | Rapaport | H04N 21/8358 |
| | | | | 715/753 |
| 2013/0039422 | A1* | 2/2013 | Kirchhoffer | H04N 19/119 |
| | | | | 375/240.13 |
| 2015/0269770 | A1* | 9/2015 | Jenkins | G06T 15/20 |
| | | | | 345/421 |
| 2016/0082597 | A1* | 3/2016 | Gorshechnikov | B25J 9/1697 |
| | | | | 700/253 |
| 2018/0239948 | A1* | 8/2018 | Rutschman | G06T 7/20 |

* cited by examiner

*Primary Examiner* — Angelica Ruiz
(74) *Attorney, Agent, or Firm* — Derek H. Maughan

(57) ABSTRACT

Described herein are methods, systems, and storage media having computer-processable instructions for cross-referencing in a computationally efficient manner different data sets each having pluralities of n-dimensional identifiers of physical assets. The disclosed cross-referencing approach can be used to determine relationships between different assets and their respective asset identifier strings. The relationships can be established based on user-selected heuristics. For example, at least two asset identifier strings can be compared, and user-defined heuristics can be applied to determine whether "a match" exists. A match can be defined according to the particular heuristic. In one instance, the comparison and heuristic can be applied to determine if two different asset identifier strings refer to a single physical asset.

16 Claims, 13 Drawing Sheets

Length-0

Length-1

Length-2

Length-3

METHODS AND DATA STRUCTURES FOR EFFICIENT CROSS-REFERENCING OF PHYSICAL-ASSET SPATIAL IDENTIFIERS

CROSS-REFERENCE TO RELATED APPLICATIONS

This invention claims priority from, and is a continuation in part of, U.S. patent application Ser. No. 16/191,829, entitled Spatial Identification of Assets Using N-Dimensional Asset Identifiers, filed Nov. 15, 2018, which claims priority from provisional patent application No. 62/587,611, entitled Unique Building Identification, filed Nov. 17, 2017. Both applications are incorporated herein by reference.

ACKNOWLEDGEMENT OF GOVERNMENT SUPPORT

This invention was made with Government support under Contract DE-AC0576RL01830 awarded by the U.S. Department of Energy. The Government has certain rights in the invention.

FIELD

The present disclosure relates generally to geographic information system (GIS) workflows, and more particularly to cross-referencing in a computationally efficient manner different data sets each having pluralities of n-dimensional identifiers of physical assets.

BACKGROUND

Spatially identifying and tracking an asset, such as a building, is a fundamental capability that can enable many industrial applications. Traditionally, assets have been conceived of as occupying a place or location and, therefore, have been identified with a system of street addresses or geographic coordinate points. These kinds of systems have many insufficiencies when attempting to uniquely identify assets, to append and join data from disparate sources, and to computationally process asset identifiers efficiently (especially when processing large quantities of identifiers). Examples of insufficiencies can include, but are not limited to address name duplicates, computationally taxing data structures, disparate identification schemes, and difficult-to-interpret, opaque identifier formats. An identification scheme can refer to a method of assigning identifiers to records in a set. The term "disparate" implies that said schemes are essentially different, i.e., incompatible with one another.

In one example, multiple ways of identifying particular buildings using addresses or local numbering systems and/or multiple buildings being identified by particular addresses makes joining data from disparate sources difficult or impossible. The disparity becomes a major obstacle to information and knowledge exchange, particularly when comparing large sets of building data. Comparing two data sets that identify buildings in a city, one might have multiple GPS coordinates for a single building and the other might have multiple buildings identified by a single street address. Determining whether a GPS coordinate or street address from each set refers to a single building is computationally difficult, if not impossible using traditional identifiers and analysis methods/systems. Accordingly, a need exists for methods, systems, and non-transitory computer-readable storage media for spatially, or spatially and temporally, identifying an asset in a manner that overcomes limitations of traditional approaches to facilitate adoption across many industries and integration into many applications. Furthermore, a need exists for methods, systems, and non-transitory computer-readable storage media having programs for cross-referencing in a computationally efficient manner different data sets each comprising pluralities of n-dimensional identifiers of physical assets.

SUMMARY

Disclosed are methods, systems, and non-transitory computer-readable storage media for assigning an n-dimensional asset identifier to an asset ($n \geq 3$). The embodiments disclosed herein can provide asset identifiers that are unique, standardized, computationally efficient, non-opaque, and scalable. The identifiers have at least a spatial aspect for the asset. Some embodiments can further have additional aspects including, but not limited to, a temporal aspect.

In some embodiments, a method of assigning an n-dimensional asset identifier to an asset comprises determining a position of the asset in n dimensions ($n \geq 3$), wherein the position is based at least on the center of mass of the asset's modeled geometry; determining an extent for each of the n dimensions, wherein each extent is measured from the center of mass to a surface of an n-dimensional bounding polytope containing the asset; and encoding the position and the extents of the asset into a single, non-opaque, code string that can be stored on computer-readable media. In certain embodiments, the asset is a building, a floor of a building, a room in a building, building HVAC equipment, building electrical equipment, building mechanical equipment, valuable inventory, an art artifact, a monument, a landmark, a buildable area or volume, a vehicle, a telecommunications installation, a basic infrastructure installation, a person, or a combination thereof. In certain embodiments, the method can further comprise referencing the position and extents to a grid reference system having n-dimensions, wherein the grid reference system comprises uniform, non-overlapping grid cells and overlays at least a portion of Earth's surface. In certain embodiments, each position within the portion of the Earth's surface is within exactly one grid cell and has one unit of extent in length, width, and height dimensions. In certain embodiments, one of the n dimensions of the grid system is height and the method further comprises the steps of: defining a stratum as a span between a fixed minimum height and a fixed maximum height at a higher altitude than the minimum height, wherein no polytope extends outside the stratum; and sub-dividing the stratum into nested layers, wherein increasingly nested layers correspond to finer resolutions. In certain embodiments, the method can further comprise contributing one symbol to the non-opaque code string for each nested layer. In certain embodiments, the polytope is a hyperrectangle. In certain embodiments, the n dimensions comprise length, width, and height. In certain embodiments, the n dimensions comprise length, width, and time. In certain embodiments, n is greater than or equal to four and the n dimensions comprise length, width, height, and time. In certain embodiments, the method can further comprise not encoding the asset's geometry into the non-opaque, code string. In certain embodiments, a plurality of single, non-opaque, code strings are comparable for functional equivalence. In certain embodiments, said step of determining a position is based on a map image.

In some embodiments, a method of assigning an n-dimensional asset identifier to an asset comprises defining a stratum as a span between a fixed minimum height and a fixed maximum height at a higher altitude than the minimum height; sub-dividing the stratum into nested layers, wherein increasingly nested layers correspond to finer resolutions; determining from a map, a position of the asset in n dimensions (n≥3) comprising length, width, and height, wherein the position is based on the center of mass of the asset's geometry; determining an extent for each of the dimensions, wherein each extent is measured from the center of mass to a surface of an n-dimensional bounding hyper-rectangle containing the asset, wherein no bounding hyper-rectangle extends outside the stratum; referencing the position and extents to a grid system having n-dimensions, wherein the grid system comprises uniform, non-overlapping grid cells and overlays at least a portion of Earth's surface; and encoding the position and the extents of the asset into a single, non-opaque, code string that can be stored on computer-readable media, wherein the code string does not encode the asset's geometry and wherein two non-opaque, code strings are directly comparable for functional equivalence.

In some embodiments, a non-transitory computer readable storage medium can store one or more programs, the one or more programs comprises instructions, which when executed by one or more processors of an electronic device cause the device to determine a position of an asset in n dimensions (n≥3), wherein the position is based at least on the center of mass of the asset's geometry; determine an extent for each of the n dimensions, wherein each extent is measured from the center of mass to a surface of an n-dimensional bounding polytope containing the asset; and encode the position and the extents of the asset into a single, non-opaque, code string that is a computer-readable, n-dimensional identifier of the asset. In certain embodiments, the non-transitory computer readable storage medium stores programs comprising instructions, which when executed further cause the electronic device to reference the position and extents to a grid reference system having n-dimensions, wherein the grid system comprises uniform, non-overlapping grid cells and overlays at least a portion of Earth's surface. In certain embodiments, the non-transitory computer readable storage medium stores programs comprising instructions, which when executed further cause the electronic device to define a stratum as a span between a fixed minimum height and a fixed maximum height at a higher altitude than the minimum height, wherein no polytope extends outside the stratum; and sub-divide the stratum into nested layers, wherein increasingly nested layers correspond to finer resolutions. In certain embodiments, the n dimensions comprise length, width, and time. In certain embodiments, the non-transitory computer readable storage medium stores programs comprising instructions, which when executed cause the electronic device to encode the position and the extents of the asset into a single, non-opaque, code string do not encode the asset's geometry into the non-opaque, code string. In certain embodiments, two single, non-opaque, code strings are directly comparable for functional equivalence.

In certain embodiments, the non-transitory computer readable storage medium stores programs comprising instructions, which when executed further cause the electronic device to concatenate the non-opaque code string by removing any symbol not associated with dimensions of length and width.

Also disclosed are methods, systems, and non-transitory computer-readable storage media for cross-referencing in a computationally efficient manner different data sets each having pluralities of n-dimensional identifiers of physical assets. The embodiments disclosed herein can determine relationships between different assets and their respective asset identifier strings. The relationships can be established based on user-defined heuristics. For example, some embodiments compare at least two asset identifier strings and apply user-defined heuristics to determine whether "a match" exists. A match is defined according to the particular heuristic. In one instance, the comparison and heuristic can be applied to determine if two different asset identifier strings refer to a single physical asset.

In some embodiments, a method of cross-referencing different sets of asset identifiers, comprises the steps of providing first and second data sets comprising records, each record comprising an n-dimensional asset identifier that encodes a center-of-mass position and center-of-mass-to-bounding-polytope extents along n dimensions (n≥2) of a physical asset in a single, non-opaque, computer-readable code string; constructing first and second trie data structures based on the first and second data sets, respectively, wherein each layer of the trie data structure corresponds with a successive degree of spatial resolution and each leaf node in a layer comprises a subset of n-dimensional asset identifiers co-located in an n-dimensional grid cell; and zipping the first and second trie data structures at a predetermined level of spatial resolution to yield a coproduct of the subsets from a pair of first and second trie-data-structure leaf nodes, the coproduct comprising a list of candidate cross-referenced pairs of records from the first and second data sets. In certain embodiments, n≥3.

In certain embodiments, said step of constructing first and second trie data structures further comprises constructing first and second trie data structures based on a portion of the first and second data sets determined by the predetermined spatial resolution. In certain embodiments, the method further comprises calculating a spatially-based statistic associated with a predetermined heuristic for the n-dimensional asset identifiers in a pair of nodes; and applying the predetermined heuristic to select a cross-referenced pair of records from the list of candidate cross-referenced pairs. In certain embodiments, the spatially-based statistic comprises a record-level statistic, a node-level statistic, trie-data-structure level statistic, a data-set-level statistic, or a combination thereof. In certain embodiments, the predetermined heuristic comprises a maximum percentage area of intersection for bounding boxes for a pair of asset identifiers. In certain embodiments, the predetermined heuristic comprises a minimum distance between centers of mass for a pair of asset identifiers. In certain embodiments, the predetermined heuristic comprises one n-dimensional asset identifier contains another.

In certain embodiments, the step of calculating a spatially-based statistic further comprises the steps of decoding an n-dimensional asset identifier to yield its center of mass and its center-of-mass-to-bounding-polytope extents, labeling respective asset identifiers in a candidate cross-referenced pair as having either the least or greatest area, and calculating the Euclidean distance between centers of mass for the candidate cross-referenced pair, wherein the predetermined heuristic comprises the pair of n-dimensional asset identifiers for which a percentage area of intersection for bounding boxes with the least area is greatest and for which a distance between two centers of mass is lowest.

In certain embodiments, the method can further comprise indexing the first data set, the second data set, or both to enhance computational efficiency. In certain embodiments, the first data set, the second data set, or both comprise a delimiter-separated values file or a spatial data format shapefile. In certain embodiments, at least one record further comprises an attribute associated with an asset identifier of the at least one record. In certain embodiments, the attribute comprises asset characteristics, asset description, asset make, asset model, asset ownership, or a combination thereof.

In certain embodiments, the method can further comprise the step of filtering the records of the first data set, the records of the second data set or both at a record-level, a node-level, a trie-data-structure level, a data-set level, or a combination thereof. In certain embodiments, the method can further comprise the step of filtering members of the list of candidate cross-referenced pairs.

In some embodiments, a non-transitory computer readable storage medium stores one or more programs, the one or more programs comprising instructions, which are executed by one or more processors to provide first and second data sets comprising records, each record comprising an n-dimensional asset identifier that encodes a center-of-mass position and center-of-mass-to-bounding-polytope extents along n dimensions (n≥2) of a physical asset in a single, non-opaque, computer-readable code string; to construct first and second trie data structures based on the first and second data sets, respectively, wherein each layer of the trie data structure corresponds with a successive degree of spatial resolution and each leaf node in a layer comprises a subset of n-dimensional asset identifiers co-located in an n-dimensional grid cell; and to zip the first and second trie data structures at a predetermined level of spatial resolution to yield a coproduct of the subsets from a pair of first and second trie-data-structure leaf nodes, the coproduct comprising a list of candidate cross-referenced pairs of records from the first and second data sets.

In certain embodiments the instructions, which are executed to construct first and second trie data structures, further comprise instructions, which are executed to construct first and second trie data structures based on a portion of the first and second data sets determined by the predetermined spatial resolution.

In certain embodiments, the non-transitory computer readable storage stores programs comprising further instructions, which are executed to calculate a spatially-based statistic associated with a predetermined heuristic for the n-dimensional asset identifiers in a pair of nodes; and apply the predetermined heuristic to select a cross-referenced pair of records from the list of candidate cross-referenced pairs.

In certain embodiments, the instructions, which are executed to calculate the spatially-based statistic, further comprise instructions, which are executed to decode an n-dimensional asset identifier to yield its center of mass and its center-of-mass-to-bounding-polytope extents; label respective asset identifiers in a candidate cross-referenced pair as having either the least or greatest area; and calculate the Euclidean distance between centers of mass for the candidate cross-referenced pair; wherein the predetermined heuristic comprises the pair of n-dimensional asset identifiers for which a percentage area of intersection for bounding boxes with the least area is greatest and for which a distance between two centers of mass is lowest.

In certain embodiments, the non-transitory computer readable storage medium stores programs comprising further instructions, which are executed to filter the records of the first data set, the records of the second data set or both at a record-level, a node-level, a trie-data-structure level, a data-set level, or a combination thereof.

The purpose of the foregoing summary and the latter abstract is to enable the United States Patent and Trademark Office and the public, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

DETAILED DESCRIPTION

Figure 1:
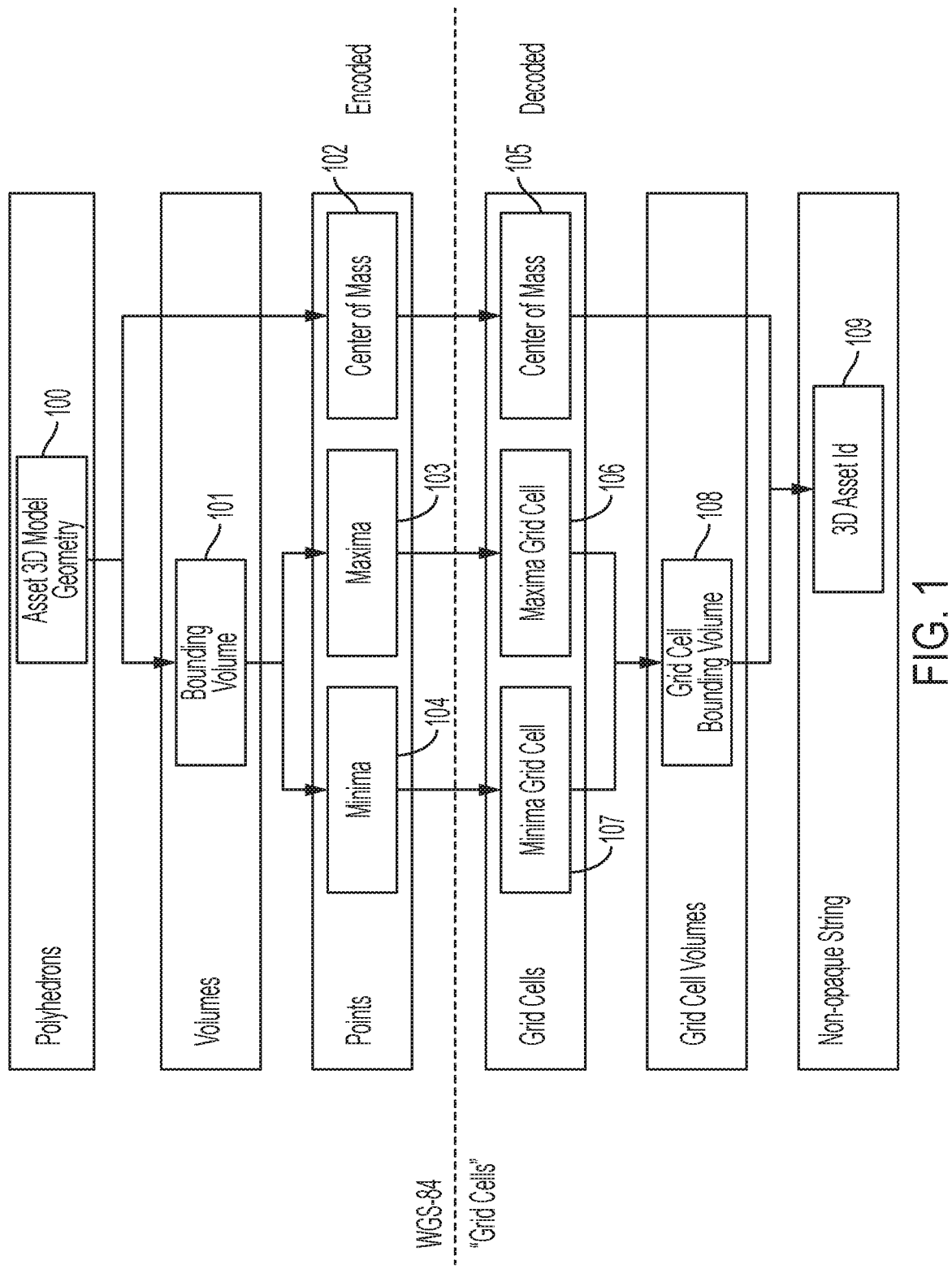
FIG. 1 is a flow diagram depicting one embodiment of the assignment of a 3-dimensional asset identifier to an asset, wherein the dimensions are length, width, and height.

Physical addresses, which have been used for centuries to locate an asset or place in the physical world, become deficient in the digital world. The inventors have observed that addresses are error-prone, lack one-to-one relationship with assets, and do not present any mutual exclusivity relative to another asset or address. Furthermore, there is not a uniform standard and as a result, cultural methodologies for identifying a location may not be clearly understood across ethnicities and languages. Difficulty in computationally joining data from disparate sources in a single location, due to the different ways of identifying assets using names, addresses, or local numbering systems, becomes a major obstacle to information and knowledge exchange and can prevent appropriate analysis and scientific insights.

A variety of approaches has been attempted to address these issues and concerns. Each of these prior approaches has a unique set of limitations that inhibit them from wide spread adoption. Geocoding, for example, is the process of transforming a description of a location, such as coordinates and/or an address, to a location on the earth's surface. A set of latitude and longitude coordinates are commonly used as the equivalent of an asset location, known as geocodes. In the example of buildings, geocodes are traditionally directly linked to the physical address of a building. However, geocodes have similar problems as address, such as buildings with multiple geocodes, multiple buildings sharing a single geocode, or geocodes pointing to the street instead of the building footprint. Google's Place ID is a variation of the geospatial locator approach. It is a geohash code, which encodes latitude and longitude (such as 38.883687 and −77.024437) to a random code (such as ChIJD9mMzXe3t4kR6-FvrqmdTw06gkzwgjzn820) for URLs and machine-to-machine communication. Most importantly, the geohashes are fundamentally a string of random alphanumeric characters and do not provide any geographic or contextual reference. The Place IDs although it is meaningful for a database appears to be random numbers to users. They are examples of opaque strings. The information content of an "opaque" string is merely the string itself. In other words, the capabilities of an "opaque" string are limited to testing if two such strings are either identical or non-identical.

The problem of uniquely identifying assets in space and/or time in a computationally efficient manner can be solved by embedding, or encoding, both position and extents of an asset into a non-opaque string. The position and the extent information are intrinsic to the string. The unique asset identifiers described herein give consideration to feasibility and scalability of adoption and integration. They are easy to adopt and implement, and certain embodiments do not require a centralized database or authority to generate the identifiers. Accordingly, in some embodiments, all information needed to create an identifier is publicly available. Furthermore, following a standard ruleset, multiple entities can generate the same identifier for the particular asset without referring to one another. Another consideration is usability. Although the identifiers described herein are intended primarily for data exchange and not primarily for replacement of an address or name for vernacular asset identification, one can transcribe an asset identifier without any errors or confusion. In some embodiments, identifiers are as short as possible, avoid the use of special characters that are difficult to transcribe (such as "!" "#" "?" and "\"), and not be case sensitive. Identifiers can further allow easy encoding and decoding, which is important for data verification. One can use non-proprietary information to verify an identifier. Such identifiers can be encoded and decoded without a central authority. Hence, they can be verified without a central authority. However, "ownership" of an identifier and the validity of the assignment itself may be determined by a central authority.

Examples of assets, to which an identifier can be assigned include, but are not limited to buildings, floors of buildings, rooms in a building, building HVAC equipment, building electrical equipment, building mechanical equipment, valuable inventory (e.g., supply chain inventory), art artifacts, monuments, important landmarks, buildable areas or volumes, vehicles, telecommunications installations, basic infrastructure installations, and even persons. Examples of building equipment (e.g., HVAC, electrical and/or mechanical) can include, but are not limited to, pumps, motors, generators, air conditioning units, water heaters, photovoltaic panels, elevators, escalators, and networking devices. Examples of basic infrastructure installations can include, but are not limited to roads, bridges, dams, water and sewer system components, railway components, and subway components, airports, harbors, traffic signals, fire hydrants, and transit stations or stops. Examples of telecommunications installations can include, but are not limited to, cellular towers, switching systems, satellite dishes, edge data centers, home energy management gateways for demand response and energy efficiency measurement and verification (M&V), and other network equipment. As used herein, a buildable area or volume can refer to an area or volume defined by a boundary, which can be non-physical. For example, an architectural buildable area is a space defined by local zoning. Similarly, a region to which air rights exist can be encompassed by the term buildable volume.

In one embodiment, a generalized N-dimensional asset identifier can be determined as follows. For each dimension, which must be continuous, establish the minima and maxima. The total extent is, therefore, equal to "maxima−minima". For each dimension, establish the ratio for subdivision. The ratio can be determined according to predetermined and/or fixed values. In one embodiment, a total extent is divided initially by a predetermined value and successive divisions are selected such that each subdivision is divisible by a fixed whole number. For example, a ratio of 1:20 divides the total extent into 20 segments (e.g., grid cells in a grid reference system), each of extent "1/20*(maxima−minima)". Hence, the span of the kth extent is from "minima+((k−1)/20*(maxima−minima))" to "minima+(k/20)*(maxima−minima))". For each dimension, establish an alphabet of symbols to denote each span, e.g., a ratio of 1:20 would require 20 symbols, e.g., 0123456789ABCDEFGHJK. Perform a number of subdivisions and denote the result of each subdivision by the corresponding symbol. The result, for each dimension, is a sequence $X_1$, $X_2$, $X_3$, etc., where, in this case, "X" denotes a given dimension. Establish a notation, e.g., write the sequence of symbols for the first dimension, followed by the sequence of symbols for the second dimension, etc.; or interleave the nth symbol for each dimension. In the case of a time dimension, the "minima" and "maxima" can be epochs. Hence, a "ratio" can correspond to years, months, hours, etc.

The identifiers described herein can be considered representations of information, but are not an assertion of information. The assertion of an asset identifier (and, for example, its association with an asset) is separate from the representation. For example, if an asset identifier incorporates a temporal dimension, then such an identifier would identify the location, spatial extent and temporal extent of the asset. If the asset changes, then the assertion changes (i.e., we assert an association with a different asset identifier). The original asset identifier does not change. Moreover, the temporal extent would be the span (of time) for which the spatial extent holds. In other words, it is not a timestamp (it is a time interval).

Referring to FIG. 1, one embodiment depicting the assignment of a three-dimensional (i.e., N=3) asset identifier to an asset is shown. As illustrated, the dimensions are length, width, and height. Initially, the asset is represented by a three-dimensional spatial model 100, such as a polyhedron. The model can be defined by a user, determined computationally according information provided by a data source, or both via a user-computer interaction. A center of mass position 102 is calculated according to the polyhedron modeling the asset. The center of mass is based on the three-dimensional polyhedron model and not on the bounding polytope or volume. In certain embodiments, the density of the model geometry is assumed to be uniform.

In the illustrated embodiment having three dimensions, the bounding polytope comprises a bounding volume 101 and is defined as a minimum cuboid that encompasses the model geometry. The minima 104 and maxima 103 of the bounding volume for the bounding volume are determined based on predetermined outermost corners. The minima is located at the lowest altitude in a predetermined point of the bounding volume. The maxima is located at the highest altitude in another predetermined point different than that of the minima. The center of mass, maxima, and minima describe the bounding volume that encompasses the model geometry and can be denoted according to a coordinate system. One instance of determining extents in a coordinate system uses a three-dimensional coordinate system comprising latitude, longitude, and altitude. The minima can be the lowest altitude in the southwest corner of a bounding volume and the maxima can be the highest altitude in the northeast corner of the bounding volume.

Based on a grid reference system covering the surface of the Earth, each of the center of mass, maxima, and minima can then be converted to a grid cell containing each respective point 105, 106, and 107. The volume of the bounding volume 108, or a representation thereof, is also determined based on the grid reference system. In the instance from the previous paragraph, the extents from the grid cell containing the center of mass to the grid cells lying on the faces of the bounding volume in north, south, east, west, upper, and lower directions from the center of mass are measured on the basis of the number of grid cells.

The three-dimensional asset identifier 109 is encoded based on the center of mass, the maxima, the minima, and the six extents. In the instant example, the minimum number of values used in the three-dimensional asset identifier is fifteen: three dimension values for each of the center of mass, maxima, and minima grid cells and six values for the north, south, east, west, upper, and lower extents.

In some embodiments, the grid reference system comprises an n-orthotopic (i.e., hyperrectangular) grid reference system. In certain embodiments, the grid reference system implementation can be based on an arbitrary functor, a type that can be mapped over (viz., for each value, the application of a function derives a new value), wherein a variety of functors is the one-parameter semigroup of length-n vectors (each length, the value of the parameter, n, is a distinct functor; and two vectors of length-i and length-j respectively may be concatenated to yield a new vector of length-(i+j)). A three-dimensional orthotope can be called a rectangular prism. In certain embodiments, grid reference systems described herein decouple the computation and presentation of the identifier string. Such embodiments allow for the ordering and/or re-ordering of the values in a string to facilitate compatibility between different sources each generating identifier, the appending of values associated with added functionality to an identifier string, or both. In certain embodiments, the n-orthotopic grid reference system comprises, length, width, and height. In certain embodiments, the grid system comprises uniform, non-overlapping grid cells and overlays at least a portion of Earth's surface. Each position within the portion of the Earth's surface can be within exactly one grid cell and has one unit of extent in length, width, and height dimensions. Every position within the "portion" lies within exactly one grid cell, and therefore has one unit of extent in every dimension. One grid cell may contain many positions.

In one example, consider a three-dimensional grid covering the surface of the Earth and subdividing the surface into three-dimensional volumetric elements (viz., voxels). All grid cells lie on the same manifold (viz., the surface of the Earth) and each grid cell can be said to have dimensions of X×Y×Z, where Z is the total vertical span (i.e., the unit height). X and Y can have extents according to a predetermined definition. For example, X and Y can each be $\frac{1}{20}$ of the total length span and $\frac{1}{20}$ of the total width span, respectively. If Z (height) is defined as a fraction of the total vertical span, then the grid system can be subdivided in the Z (height) direction. For example, a minimum and maximum height can be predefined, thereby setting the maximum vertical span of a stratum. The stratum can then also be subdivided hierarchically to increase resolution.

Traditional grid reference systems are not compatible with dimensionality that is greater than 2. For example, some grid systems interleave the values for X and Y in their calculation. The addition of a Z value would interfere with functionality of strings generated with such 2D grid systems. In such instances, embodiments described herein can append the Z values to the end of a string in which X and Y values are interleaved. In these embodiments, a lower dimensional encoding can be recovered by eliding the additional dimensions. For example, the Z dimension can be elided from the three-dimensional encoding. One example follows, where $X_k$ denotes the kth character in the string encoding of the X value, $Y_k$ denotes the kth character in the string encoding of the Y value, and $Z_k$ denotes the kth character in the string encoding of the Z value.

$$X_1Y_1X_2Y_2 \ldots X_iY_i \ldots Z_1Z_2 \ldots Z_i$$

Second, consider non-unit values for the extent of the third dimension. To locate an arbitrary point within a three-dimensional grid requires that the minimum and maximum heights of the grid be fixed, and subsequently, subdivided. In certain embodiments, points that lie outside of the minimum and/or maximum height are not encoded.

In some embodiments, the non-opaque code string can be reduced by one or more dimensions by removing the symbols and extents associated with the one or more dimensions. In certain embodiments, any symbol not associated with dimensions of length and width are removed.

One quality of n-dimensional asset identifiers as described herein is the flexibility with which a particular string can be assigned to an asset. Two or more identifier strings can differ in value while identifying the same asset. For example, two people who have different initial asset geometries can derive, according to embodiments described herein, different asset identifier strings that refer to a single asset. The centers of mass and/or the respective extents to the bounding polytopes will differ between the two initial geometries. The "bounding polytopes" differ when the two geometries do not have the same grid-aligned bounding box. There are at least three cases. Two assets with the same geometries can have the same center of mass and grid-aligned bounding boxes, which yields the same asset identifier string values. Two assets with different geometries can have different centers of mass. If they have the same grid-aligned bounding boxes, then the asset identifier string will have different values because the centers of mass differ. If they have different grid-aligned bounding boxes, then the asset identifier strings will have different values because the bounding box differs. Using embodiments described herein for cross-referencing asset identifiers, one can determine whether the different asset identifier strings refer to the same asset. Embodiments compare at least two asset identifier strings and apply user-defined heuristics to determine whether "a match" exists. A match is defined according to the particular heuristic.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

To facilitate review of the various embodiments of the disclosure, the following explanations of specific terms are provided:

As used herein, an asset's location is a "pure math" point on a manifold (e.g., Euclidean space). An asset's position is a representation of its location using a coordinate system or a grid system. The "center of mass" of an asset can refer to the mean position of the matter in the asset. The matter can be assumed to have uniform density. The center of mass is determined based on the asset's geometry in N-dimensions. The geometry of the asset can be modeled with a predetermined error tolerance in order to satisfy resolution requirements. The center of mass is not determined from a bounding polytope encompassing the asset. In certain embodiments, the bounding polytope is the minimum n-polytope that encompasses the n-dimensional model of the asset. The center of mass is not necessarily within the polytope. The asset's geometry can be represented by a model. For example a building can be represented by a rectangular box or group of rectangular boxes in three dimensions (i.e., length, width, height).

A grid reference system defines locations on maps using grid cells and can be based on a coordinate system. A grid reference locates a unique region on the map. Examples include Universal Transverse Mercator (UTM), Universal Polar Stereographic (UPS), Military Grid Reference System (MGRS), and the United States National Grid (USNG). The advantage of grid reference systems, as described herein, over latitude and longitude is that a grid reference code is not a single point map projection. In other words, it can be used to represent an n-dimensional space, not merely a single point. In embodiments described herein, Earth is hierarchically divided into a grid of various shapes and sizes. Similarly, time as a dimension can be hierarchically divided into periods of various durations. For example, time is considered a dimension in Minkowski spacetime, wherein three-dimensional Euclidean space and time are combined into a four-dimensional manifold where the spacetime interval between any two events is independent of the inertial frame of reference in which they are recorded.

In the context of comparing a plurality of asset identifiers, functional equivalence for a given unary function f (an N-dimensional asset identifier encoding function) and a binary function g (a Boolean-valued, asset identifier "is a match" criteria function) is to say that "g(f(x), f(y))=TRUE." In one analogy, for two geometries, x and y, equivalence/equality is akin to saying that x=y. Direct comparison of geometries is inefficient and/or impractical. First, note that two shapes are said to be equal if they share all interior points. However, consider the definition of the geometry for a given shape as sequence of points that define its exterior ring. The set of interior points is preserved if the sequence is reversed; however, the definitions of the "forwards" and "reversed" sequences are not equal. Given the above, computation of this equivalence would require the enumeration of all points within x, all points within y, and then point-by-point comparison; a computationally expensive operation. Accordingly, embodiments of the N-dimensional asset identifiers having the characteristic of being comparable for functional equivalence against other asset identifiers as described herein is an unexpected benefit that has been determined by the inventors.

Non-transitory as used herein when referring to a computer-accessible medium, is a limitation of the medium itself (i.e., tangible, not a propagating electromagnetic signal) as opposed to a limitation on data storage persistency. The term is not intended to otherwise limit the type of physical computer-readable storage device that is encompassed by the phrase computer-accessible medium or memory. For instance, the terms "non-transitory computer readable medium" or "tangible memory" are intended to encompass types of storage devices that do not necessarily store information permanently, including but not limited to, computer-readable media that store data only for short periods of time and/or only in the presence of power, such as register memory, processor cache and Random Access Memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Figure 2:
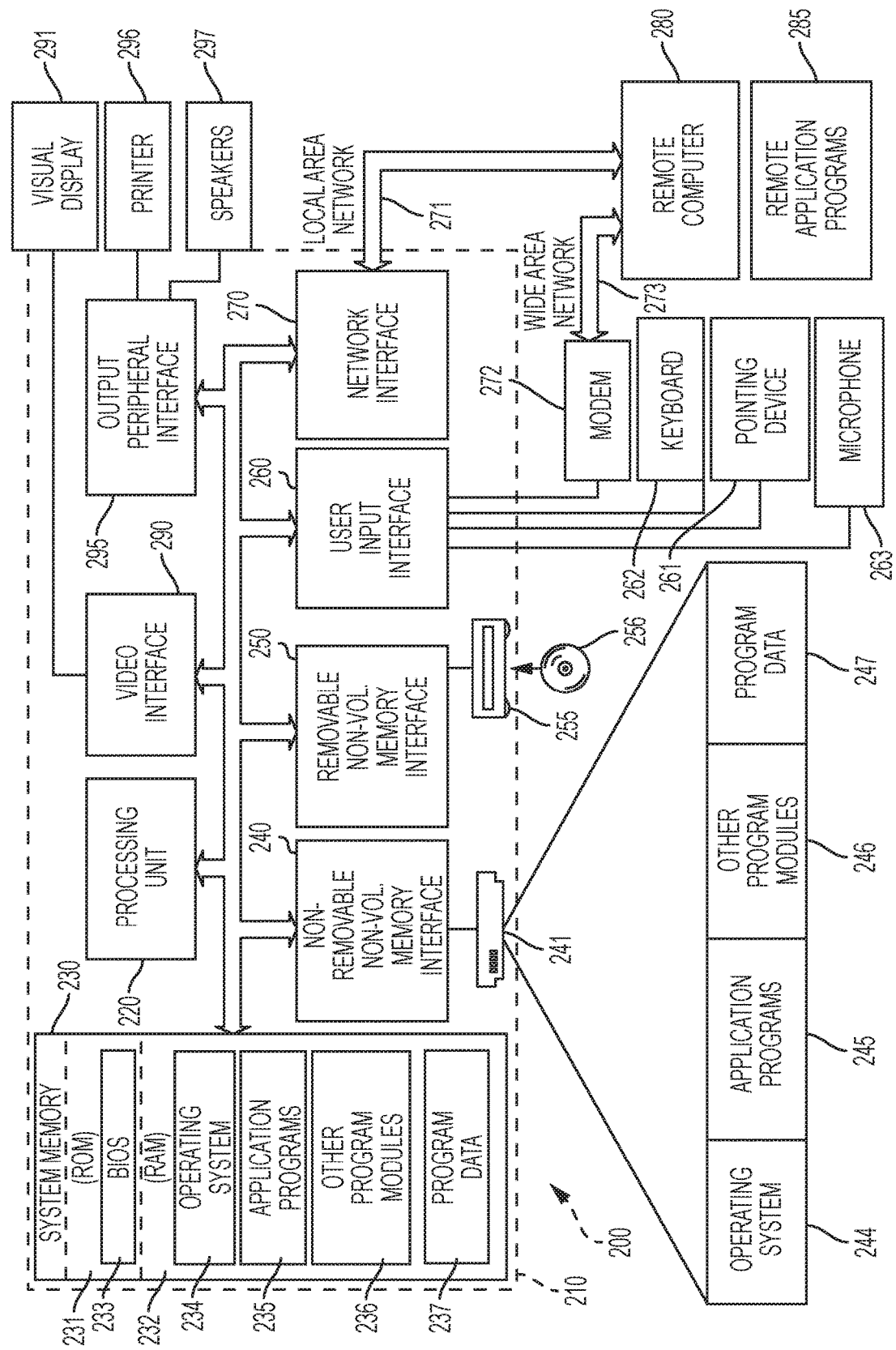
FIG. 2 is an illustration representing one embodiment of a computational system for assigning an N-dimensional asset identifier to an asset.

FIG. 2 is one embodiment of a computing environment by which an N-dimensional asset identifier can be computed and/or analyzed. It is also one embodiment by which two data sets comprising pluralities of n-dimensional asset identifiers can be cross-referenced. In one example, a computing environment such as shown in FIG. 2 can be used to process asset related information and assign an N-dimensional asset identifier to the asset. For instance, an asset model geometry 100 can be received as input via the network interface 270, or via the removable non-volatile memory interface 250. Alternatively, the model geometry can be stored in the non-removable, non-volatile memory interface. The processing unit 220 can be used to determine a bounding polytope 101, a center of mass 102, a maxima 103, and a minima 102. The processing unit 220 can further be used to convert into the grid system the bounding polytope 108, the center of mass 105, the maxima 106, and the minima 107.

The processing unit 220 can also be used to encode the appropriate grid cells into a non-opaque code string as the asset identifier 109.

In another example, a computing environment such as shown in FIG. 2 can be used to process data sets comprising records annotated with n-dimensional asset identifiers and cross-referencing the data sets. For instance, first and second data sets, each comprising a plurality of n-dimensional asset identifiers can be received as input via the network interface 270, or via the removable non-volatile memory interface 250. Alternatively, the data sets can be stored in the non-removable, non-volatile memory interface. The processing unit 220 can be used to construct first and second trie data structures based on the first and second data sets. The processing unit 220 can further be used to zip the first and second data structures to yield a coproduct of the subsets from a pair of first and second trie-data-structure leaf nodes. The processing unit 220 can also be used to calculate a spatially-based statistic associated with a predetermined heuristic and apply the heuristic to select a cross-referenced pair of records from a list of candidate cross-referenced pairs.

With reference to FIG. 2, an example system for implementing some embodiments includes a general-purpose computing device in the form of a computer 210. Components of computer 210 may include, but are not limited to, a processing unit 220 (which is not limited to CPUs, but can comprise GPUs), a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described herein be deployed in corresponding portions of FIG. 2.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, sash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random-access memory (RAM) 232. A basic input/output system 233 (BIOS), containing the basic routines that help to transfer information between elements within computer 210, such as during startup, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/nonremovable volatile/nonvolatile computer storage media. By way of example only, FIG. 2 illustrates a hard disk drive 241 that reads from or writes to non-removable, nonvolatile magnetic media, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, sash memory cards, digital versatile disks, digital video tape, solid state RAM, solid state ROM, and the like. The hard disk drive 241 is typically connected to the system bus 221 through a nonremovable memory interface such as interface 240, and optical disk drive 255 are typically connected to the system bus 221 by a removable memory interface, such as interface 250.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), etc.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262, a microphone 263, and a pointing device 261, such as a mouse, trackball or touch pad. Other input devices (not shown) may include a joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A visual display 291 or other type of display device is also connected to the system bus 221 via an interface, such as a video interface 290. Video interface 290 can comprise a graphics card having a GPU. The GPU be used for computations. In addition to the monitor, computers may also include other peripheral output devices such as speakers 297 and printer 296, which may be connected through an output peripheral interface 295.

The computer 210 is operated in a networked environment using logical connections to one or more remote computers, such as a remote computer 280. The remote computer 280 may be a personal computer, a hand-held device, a server, a router, a network PC, a peer device or other common network node, and typically includes many or all of the elements described above relative to the computer 210. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on remote computer 280. It will be appreciated that the network connections shown are exemplary and other means of establishing a communications link between the computers may be used.

Examples and Comparisons of Assigning N-Dimensional Asset Identifiers to Physical Assets To further illustrate certain embodiments of the disclosed cathode materials, cathodes, battery systems and methods of making the same, and to provide various comparative analyses and data, below are some Examples with comparison test data.

N-Dimensional Asset Identifier with a Suffix for N=3, L×W×H

Figure 3A:
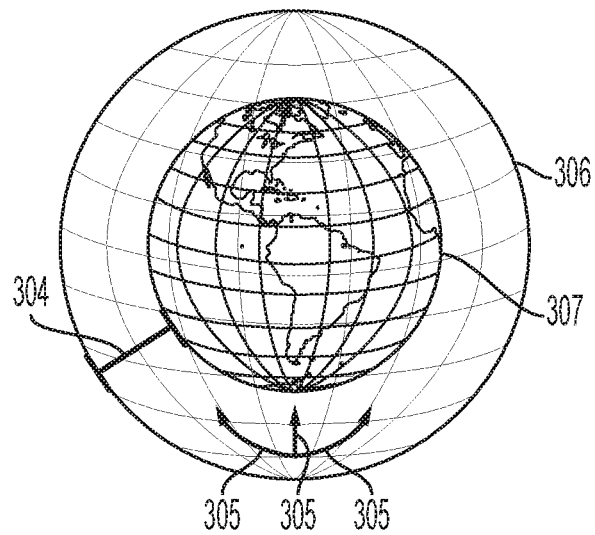
FIGS. 3A-3C are illustrations depicting various views of an embodiment of a grid reference system.
Figure 3B:
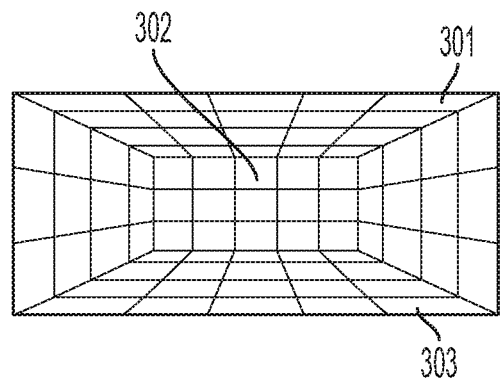
Figure 3C:
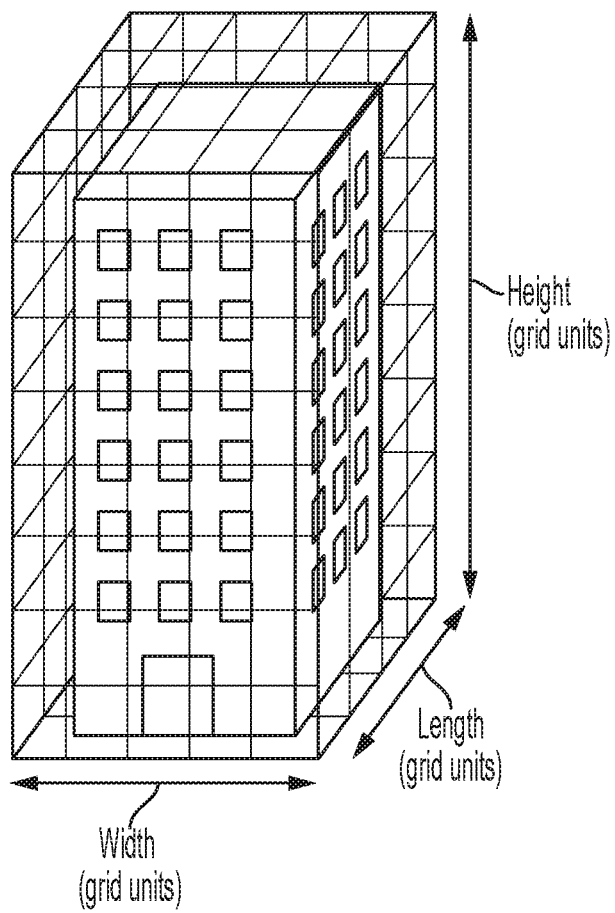
Figure 4:
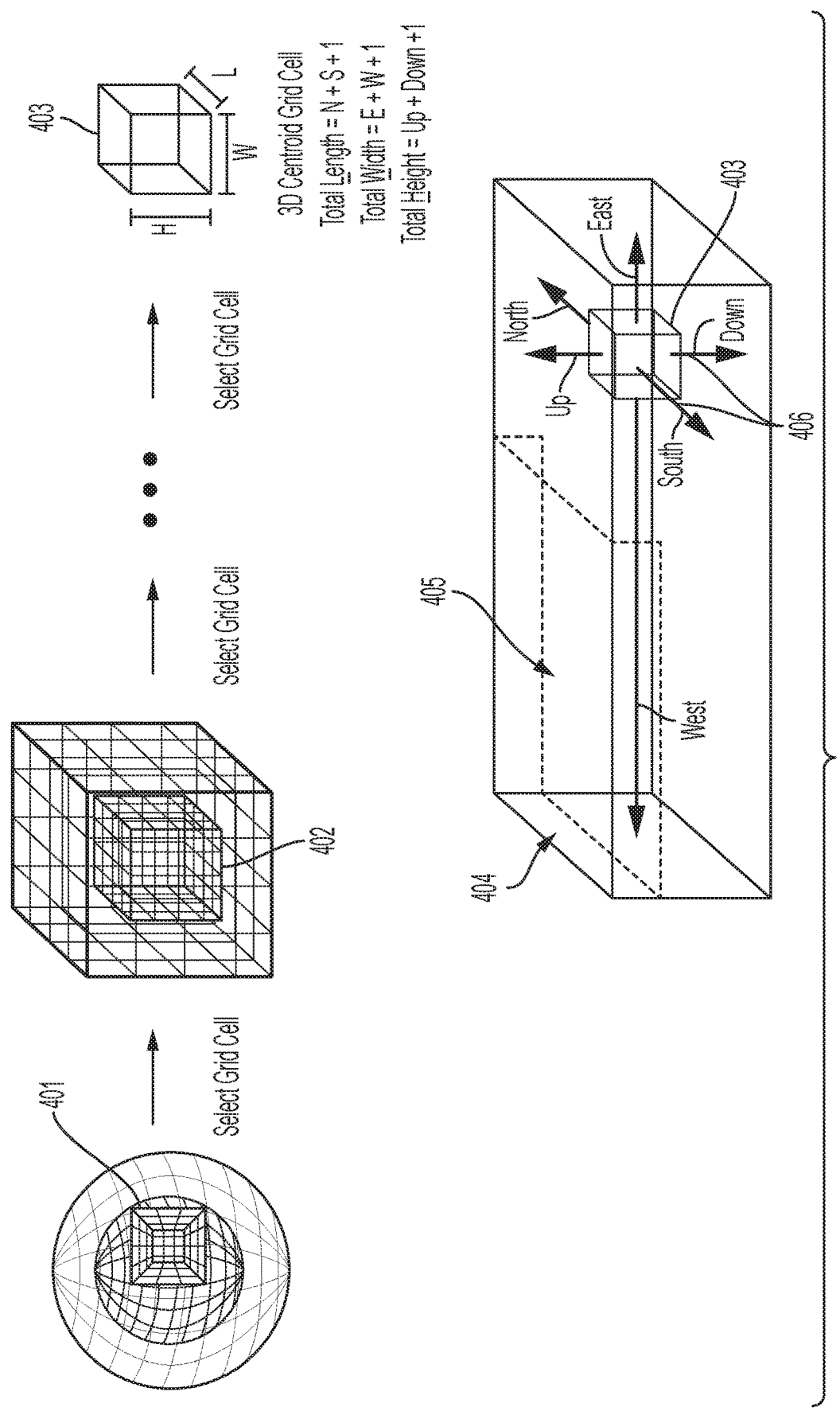
FIG. 4 is an illustration depicting a logical flow for determining a grid cell in a grid reference system, which grid cell contains a center of mass.

An example of a grid reference system in three dimensions is illustrated in FIGS. 3A-3C. In FIG. 3A, a surface level of the Earth 307 establishes a minima. The surface level 307 can be at ground level, above ground, or below ground. A sky level 306 is higher in altitude than the surface level 307 and establishes a maxima. The difference between the sky level and surface level determines the total height extent 304. Radial directions are normal to width and length aspects of the grid reference system. FIG. 3B is a top-down plan view of a volume depicting portions of the grid system. The total height extent exists between the sky level 303 and the surface level 301. Surface-to-sky normals 301 can connect lateral grid points between the surface and sky levels. A three-dimensional asset can be contained within a bounding volume described by the grid reference system. FIG. 3 is an example of a three-dimensional bounding volume encompassing a building (i.e., asset). FIG. 4 illustrates a logical flow for certain embodiments described herein. A first grid cell 401 comprising a rectangular polygon can be successively reduced in size 402, thereby increasing resolution, to identify a grid cell 403 containing the center of mass of an asset. From the center-of-mass grid cell 403, extents 406 to north, south, east, west, up and down surfaces of a bounding volume 404 can be determined. The bounding volume 404 is the minimum rectangular polygon encompassing an asset's modeled geometry 405.

Figure 5:
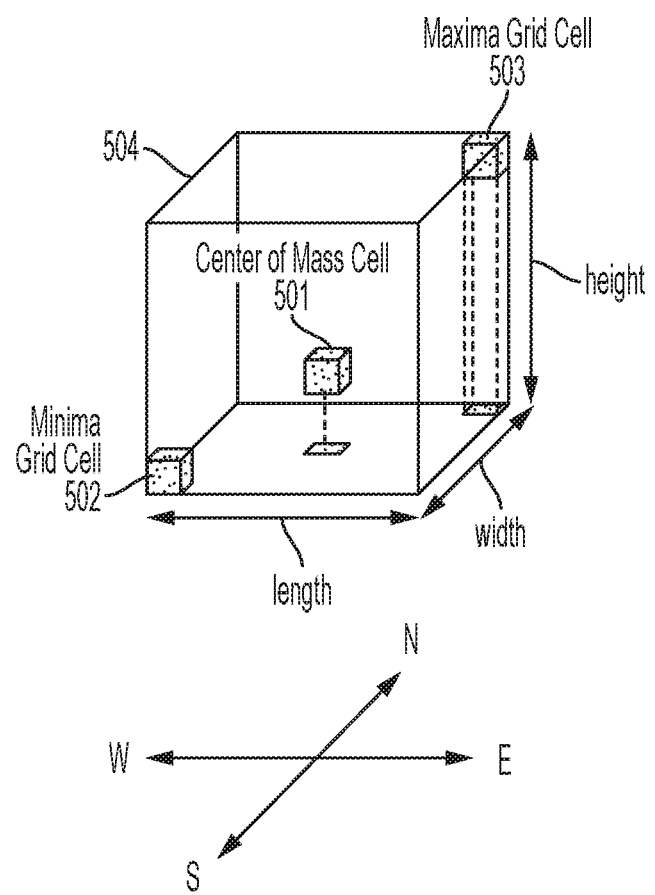
FIG. 5 is a schematic of one example of a bounding polytope, a center of mass, a maxima, and a minima for an asset.

Referring to FIG. 5, the center of mass 501, minima 502, and maxima 503 points have height (i.e., altitude) values and require nine numbers to be specified. Six extents must be expressed to specify the extents in the north, south, east, west, upward and downward directions from the center of mass. Accordingly, the non-opaque asset identifier contains the following segment, wherein C is the center of mass of the asset geometry and n, e, s, w, up, and down are extents in the north, east, south, west, upward, and downward directions measured from the center of mass to the rectangular bounding volume.

C-n-e-s-w-up-down

In the instant example, the asset identifier code string "C-n-e-s-w" uses hyphens "-" to separate the individual string segments. In certain embodiments, a second separator character is used, for example, forward slash "/" or dollar "$" symbols. The code string is appended to include additional information, for example, as a suffix. Preferably, a symbol for the separator that is not present in the asset identifier code string is selected, and the original asset identifier code string can be recovered as a string prefix. Hence, all established methods and algorithms for analysis of the asset identifier code string are unaffected, and hence, the extended asset identifier is said to be backwards compatible with the original asset identifier code string.

A non-limiting example of a suffix includes Uniform Resource Identifiers (URIs). This would make the N-dimensional asset identifier code strings amenable to software-based manipulation and integration with other knowledge management systems. For example, suppose that a URI scheme is defined for floor names and numbers in an asset comprising a building. The N-dimensional asset identifier code string may be C-n-e-s-w$urn:buildingid:floor:A where "urn:buildingid:floor:" is the URI scheme and prefix, and "A" is the floor name.

Description of Cross-Referencing Different Data Sets Having N-Dimensional Identifiers of Physical Assets The inventors have determined that physical addresses, GPS coordinates, and even n-dimensional asset identifiers can be insufficient to communicate asset locations and/or exchange information regarding assets between two parties and/or systems. Difficulty in joining asset-location data from disparate sources becomes a major obstacle to information and knowledge exchange because of the different ways of identifying the locations of the assets. The grid reference system-based asset identifier described herein can represent an asset geometry (e.g., footprint, volume, spatiotemporal position, etc.) on a map using a unique, non-opaque code that is computationally efficient and that facilitates cross-referencing and statistical analysis. Furthermore, unlike geographic coordinates, which require high precision and can only locate points on the earth, the asset identifier code can record n-dimensional information about an asset location in a concise and practical manner.

However, the asset identifier itself is neither a database nor a data schema. Furthermore, converting a traditional location identifier (e.g., a traditional street address, or a GPS coordinate) to an asset identifier does not solve the problem that an asset may have more than one address, or slightly different assigned GPS coordinates. Neither does it solve the problem of multiple assets that share a single location identifier. Rather, asset identifiers described herein can serve as an external common key between databases to facilitate data mapping. Rulesets can ensure that individual implementers can reach the same conclusions utilizing available digital maps and information. It can also automatically resolve discrepancies, caused by physical space or structure changes over time, during data exchange. Embodiments can also flexibly and scalably identify a portion of an asset or a group of assets. Accordingly, embodiments described herein can compare first and second data sets comprising records, each record comprising an n-dimensional asset identifier, in order to cross-reference seemingly disparate location identifiers. This facilitates knowledge exchange regarding asset locations.

The first data set, the second data set, or both can comprise addresses, points in space, polygons, hyperrectangles, or combinations thereof. Examples can include, but are not limited to street addresses, GPS coordinates, and latitude/longitude coordinates. In certain embodiments, addresses are resolved to geographic coordinates using a geolocation service.

Figure 6:
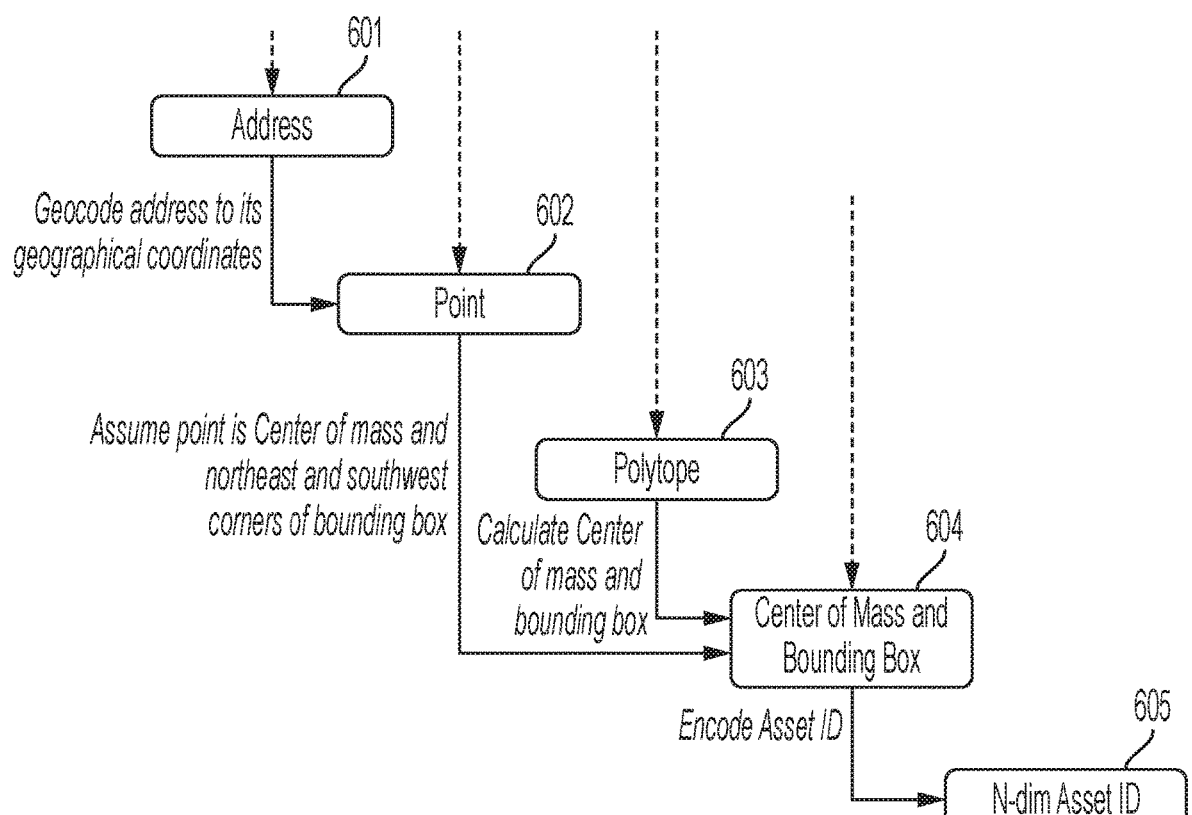
FIG. 6 is a flow chart depicting one embodiment for assigning N-dimensional asset identifiers given various kinds of information.

According to embodiments described herein, n-dimensional asset identifiers can be generated ab initio or they can be derived (i.e., converted) from an existing location identifier. Existing identifiers can include, but are not limited to traditional addresses, traditional GPS coordinates, and traditional shapefiles. In an example involving two dimensions, an identifier can be assigned to a point (i.e., coordinate) or an area (i.e., a lot on land, in the air, or at sea). In an example involving three directional dimensions, an identifier can be assigned to a cuboid volume. Additional dimensions can be "located" via the asset identifier. For example, a temporal location can be specified and/or identified. Referring to FIG. 6, an illustration depicts the assignment of an n-dimensional asset identifier code string 605 for any hyperrectangle in an n-dimensional grid system to identify a spatial or spatiotemporal location of an address 601, coordinate point 602, and/or polytope 603 (e.g., a geometry of an asset). In certain embodiments, if a polytope is provided that models an asset's geometry or shape, a center of mass and bounding polytope extents 604 are calculated as described elsewhere herein. If a geographic point is provided for the location of an asset, certain embodiments assume that the point is the center of mass as well as the northeast and southwest corners of a bounding polytope, i.e., that a point has no extent. If an address is provided, according to certain embodiments, the address is geocoded to corresponding geographical coordinates and then treated as a point. From the center of mass and bounding polytope extents, an asset identifier can be encoded as described elsewhere herein.

For a variety of reasons, an asset can be assigned multiple asset identifiers. For example, multiple asset identifiers can be assigned to a single location wherein each identifier has a different grid system resolution. Alternatively, imprecise and/or ambiguous addresses, when converted into asset identifiers can yield different values referencing the same location. Further still, two different databases can refer to a single set of assets and their locations, but be based on different identifier types. For example, one database can contain street addresses and the other can contain shapefiles and/or geographic coordinates.

For instance, a city might maintain a "building footprints (polygons)" spreadsheet that it updates once per fiscal year; adding, modifying and removing data records as buildings are constructed, extended and demolished. Asset-identifier cross-referencing as described herein can identify the data records that are present, absent or shared in the spreadsheets for any pair of fiscal years. Alternatively, the city might maintain "building footprints (polygons)" and "land parcels (polygons)" spreadsheets. Asset-identifier based cross-referencing can identify the spatial relationships between the corresponding envelopes for the data records in each spreadsheet, e.g., contains, is-contained-by, intersects, overlaps, etc. Further still, the city might maintain "building footprints (polygons)" and an energy company maintains "sensor data (points)" spreadsheets. Asset-identifier-based cross-referencing can identify the energy sensors that are located within each building.

Figure 7:
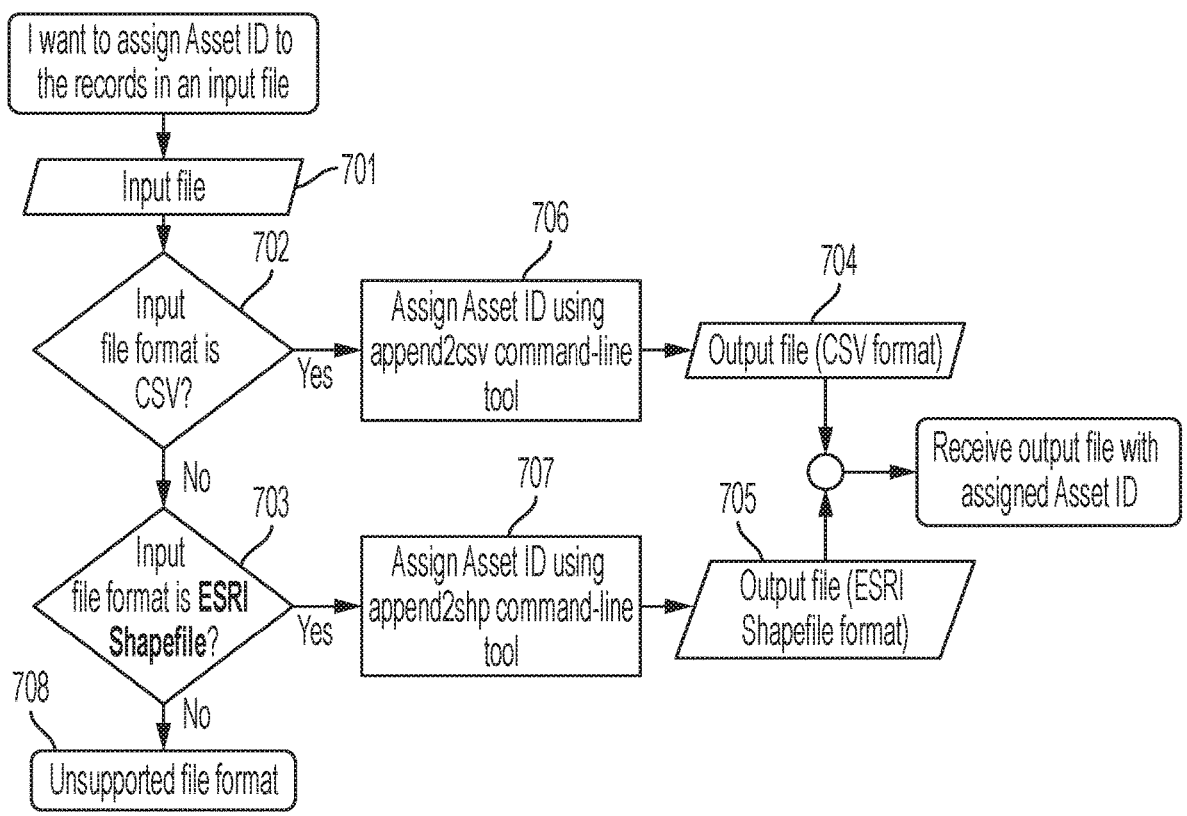
FIG. 7 is a flow chart depicting one embodiment for assigning n-dimensional asset identifiers in a data set comprising records for assets and their locations.

In certain embodiments, an n-dimensional asset identifier can be assigned to each record in a data set comprising a plurality of records. The data set can be an input file. Referring to FIG. 7, a flowchart depicts one embodiment of assigning asset identifiers to multiple records contained in an input file 701. As illustrated, an input file formatted as a comma-separated-values (CSV) file 702 or as an ESRI shape file can be processed using a command-line tool 706, 707 to append asset identifiers to each record in the file. The output file 704, 705 is maintained in the same format as the input file. Unsupported file formats 708 can be rejected. ESRI can refer to Environmental Systems Research Institute (ESRI) ShapeFile. Shapefiles can support point, line, and area features. Area features are represented as closed loop, double-digitized polygons. Attributes can be held in a dBASE® format file. Each attribute record has a one-to-one relationship with the associated shape record. A shapefile can store nontopological geometry and attribute information for the spatial features in a data set. The geometry for a feature can be stored as a shape comprising a set of vector coordinates. In the case of a "multi-polygon", the shape can be stored as a set of sets (one set per polygon). Some embodiments can receive and/or output tabular data formats and/or record-like data structures. In such embodiments, the term "attribute" typically refers to a key-value pair, where the name of the attribute is the key of the pair. Instances of record-like data structures are dictionaries that map attributes names to values, viz., sets of key-value pairs.

Figure 8:
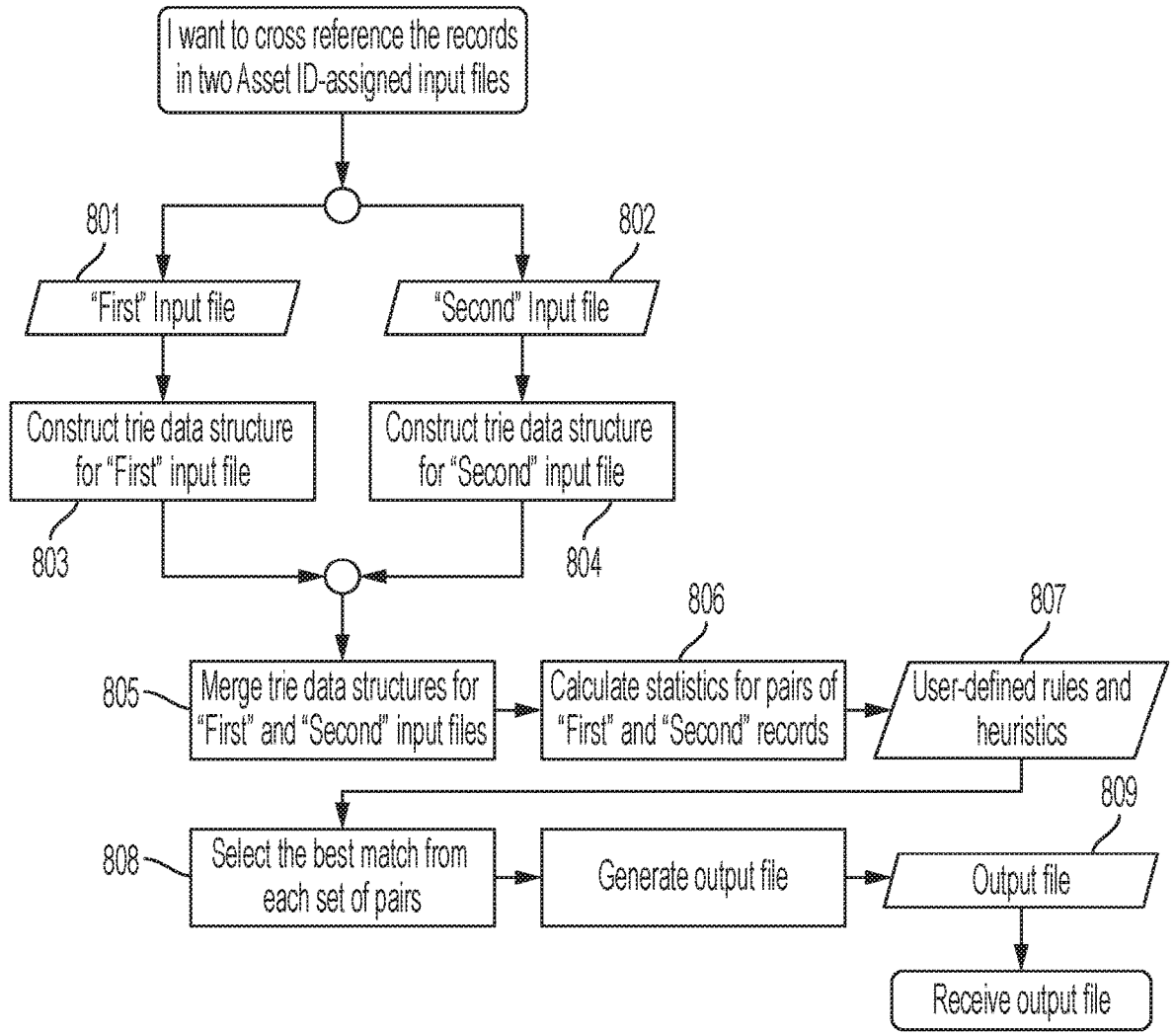
FIG. 8 is a flow chart depicting one embodiment for cross-referencing records from two data sets each comprising pluralities of asset identifiers.

FIG. 8 includes a flow diagram depicting one embodiment for cross-referencing two input files comprising data sets having a plurality of records, wherein each record comprises an n-dimensional asset identifier. Records can be annotated with the n-dimensional asset identifiers. Records can further be annotated with attributes including, but not limited to, fields, non-identifiers, and supplementary metadata. Attributes can be preserved by the cross-reference operation. For example, when a cross-reference is successful, the attributes of the elements of the first and second data sets can be merged into a single new record.

For a first input file 801 and a second input file 802 first and second trie data structures 803, 804 are constructed, respectively. The first and second trie data structures are merged 805 according to a zip operation to yield a coproduct of the subsets from a pair of first and second trie-data-structure leaf nodes, the coproduct comprising a list of candidate cross-referenced pairs of records from the first and second data sets. At least one statistic 806 is utilized in applying a user-defined rule and/or heuristic 807. The statistic can comprise a record-level statistic or an input-file-level statistic. The statistics can be calculated prior to the zip operation or after the zip operation. Alternatively, some statistics can be calculated before and after the zip operation. Based on the user-defined rule and/or heuristic a best match is selected from each set of pairs 808. An output file 809 is generated. In one example, an input can comprise two tables. The first table has suffix "left" and columns: "Asset ID", "a", "b", and "c." The second table has suffix "right" and columns: "Asset ID", "d", "e", and "f." The user specifies a suffix for the column names for each table. When the tables are combined according to embodiments described herein, the suffixes are appended to the column names that are common to both tables. The output comprises a third table having columns: "Asset ID left", "a", "b", "c", "Asset ID right", "d", "e", and "f."

Candidate cross-referenced pairs can be filtered using predefined and user-specified metrics, statistics and heuristics; including, but not limited to the grid layers at which the UBIDs are in agreement, the distance between the UBID centers of mass, and the intersection of the UBID bounding boxes. A statistic can refer to a fact or piece of data. A metric can refer to a binary function, in the sense of a topological space, that gives, for any two point in said space, a value that is equal to the distance between them. A heuristic can refer to a loosely defined rule. Metrics can be defined in terms of statistics, which are calculated as part of a heuristic. In one example, a "similarity measure" (i.e., a metric) can be defined in terms of "Euclidean distance between asset ID centers of mass" (i.e., a statistic) and/or "percentage intersection of asset ID bounding boxes" (i.e., statistics), which are calculated as part of the cross-referencing operation "the most similar UBIDs are the best matches" (i.e., a heuristic).

Figure 9:
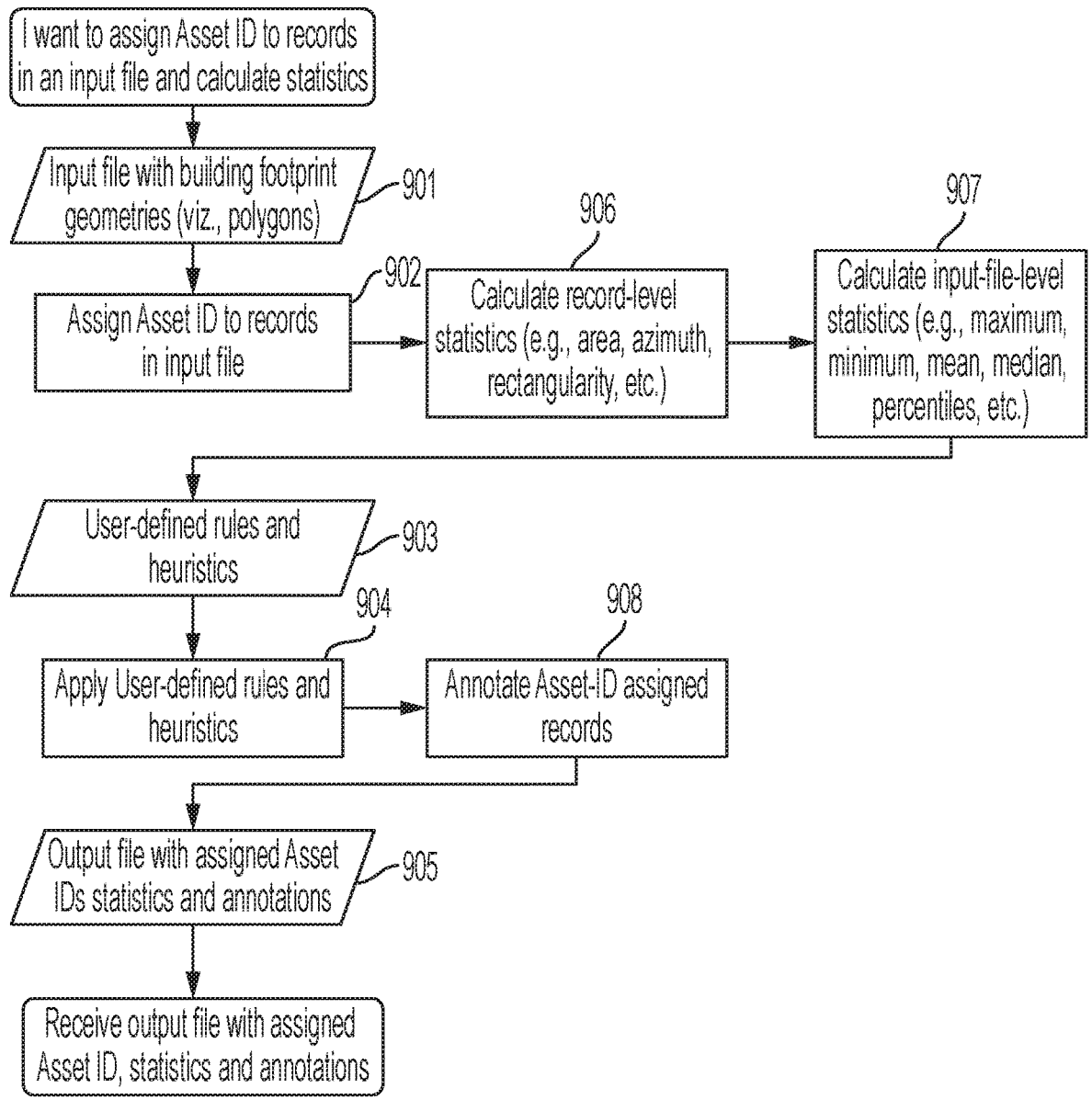
FIG. 9 is a flow chart depicting one embodiment for calculating statistics associated with user-defined rules and/or heuristics.

FIG. 9 includes a flow diagram depicting an embodiment for calculating statistics for an n-dimensional asset identifier. Examples of statistics can include, but are not limited to, the extents of the shape, e.g., length and width. From these, the length of the leading diagonal of the bounding box and/or the area of the bounding box can be calculated. Other statistics include the distance from the center of mass to the bounding polytope. As illustrated an input file 901 comprises shape models of assets as records. In particular, the file comprises building footprint geometries (i.e., polygons). As described elsewhere herein, the geometries can be used to assign n-dimensional asset identifiers to the records 902. Based on the geometries, record-level statistics can be calculated for the records. Examples can include, but are not limited to, polygon areas, azimuth rotation, center of mass "wobble," and rectangularity. Rectangularity can refer to the proportion of area of geometry to area of bounding polytope. Azimuth rotation can refer to the rotation of eastern face of minimum rotated bounding polytope with respect to the Prime Meridian. Center of mass "wobble" can refer to the distance from the center of mass of the asset geometry to the center of mass of the bounding polytope. Input-file-level statistics can also be calculated. Examples include, but are not limited to, maximum, minimum, mean, median, and percentiles of quantities described herein, which can include, but are not limited to extents, bounding polytope volume, bounding polytope footprint area, bounding polytope dimensions, and center of mass altitude. The statistics calculated for the asset identifiers can be associated with user-defined rules and/or heuristics 903. The rules and/or heuristics can be applied to the records 904, which are annotated with the statistics 908. The outputted file comprises records annotated with n-dimensional asset identifiers and statistics.

In certain embodiments, a heuristic can comprise one bounding polytope contains another. The "contains" predicate can be transitive and reflexive. If "a first asset identifier contains a second and a second contains a third" then "the first contains the third". Moreover, every shape contains itself. The inverse of the "contains" predicate is the "is-contained-by" predicate. In certain embodiments, the heuristic providing the best match is defined as the pair of asset identifiers in which the percentage area of intersection for the bounding polytope with the least area is greatest and the distance between the two centers of mass is lowest. For example, starting with 1 first asset identifier and N second asset identifiers (i.e., N pairs), for each pair of first and second asset identifiers, the corresponding bounding boxes can be labeled as having either the lowest or greatest area. The Euclidean distance between the two centers of mass can then be calculated. The pair having the greatest percentage area of intersection for the bounding polytope with the least area and the lowest distance between the two centers of mass is deemed the best match. This heuristic is referred to as "Area of intersection over minimum" in Table 1, which includes a list of examples of statistics on which heuristics can be based according to embodiments described herein.

TABLE 1

Examples of statistics on which heuristics can be based according to embodiments of the present invention.

| Statistic | Description | Units of Measurement |
| --- | --- | --- |
| Center of mass latitude | The absolute difference of the latitude coordinates of the centers of mass of the two bounding boxes. | Decimal degrees |
| Center of mass latitude w.r.t. height | The absolute difference of the offset from the latitude coordinates of the centers of mass of the two bounding boxes to the latitude coordinates of the southwest corners of the two bounding boxes. | Decimal degrees |
| Center of mass longitude | The absolute difference of the longitude coordinates of the centers of mass of the two bounding boxes. | Decimal degrees |
| Center of mass longitude w.r.t. width | The absolute difference of the offset from the longitude coordinates of the two bounding boxes to the longitude coordinates of the southwest corners of the two bounding boxes. | Decimal degrees |
| Center of mass radius | The absolute difference of the Euclidean distances from the origin to the centers of mass of the two bounding boxes. | Decimal degrees |
| Center of mass radius w.r.t. diagonal | The absolute difference of the Euclidean distances from the origin to the centers of mass of the two bounding boxes with respect to the length of the leading diagonals of the two bounding boxes. | Decimal degrees |
| Width | The absolute difference of the widths of the two bounding boxes. | Decimal degrees |
| Width | The percentage increase of the width of the largest of the two bounding boxes with respect to the width of the smallest of the two bounding boxes. | Percentage |
| Height | The absolute difference of the heights of the two bounding boxes. | Decimal degrees |
| Height | The percentage increase of the height of the largest of the two bounding boxes with respect to the height of the smallest of the two bounding boxes. | Percentage |
| Diagonal | The absolute difference of | Decimal degrees |

TABLE 1-continued

Examples of statistics on which heuristics can be based according to embodiments of the present invention.

| Statistic | Description | Units of Measurement |
|---|---|---|
| Diagonal | the lengths of the leading diagonals of the two bounding boxes. The percentage increase of the length of the leading diagonal of the largest of the two bounding boxes with respect to the length of the leading diagonal of the smallest of the two bounding boxes. | Percentage |
| Area | The absolute difference of the areas of the two bounding boxes. | Square decimal degrees |
| Area | The percentage increase of the area of the largest of the two bounding boxes with respect to the area of the smallest of the two bounding boxes. | Percentage |
| Area of intersection | The area of intersection of the two bounding boxes. | Square decimal degrees |
| Area of intersection over minimum | The percentage of the area of the smallest of the two bounding boxes with respect to the area of intersection of the two bounding boxes. | Percentage |
| Area of intersection over maximum | The percentage of the area of the largest of the two bounding boxes with respect to the area of intersection of the two bounding boxes. | Percentage |
| Area of intersection over sum | The percentage of the sum of the area of the two bounding boxes with respect to the area of intersection of the two bounding boxes. | Percentage |
| Area of intersection over union | The area of intersection of the two bounding boxes divided by the area of the union of the two bounding boxes. | Percentage |

As used herein, a "trie" can refer to a tree data structure for efficient storage and retrieval of strings of characters (viz., strings), where the root node corresponds to the empty string, there exists one branch node for each common string prefix, and the strings themselves are stored in the leaf nodes. Each layer of the trie structures described herein corresponds to a resolution level for one or more dimensions rather than the traditional approach of each layer being an additional character in the string. For our approach, each dimension can be associated with one string character, where each string character is equivalent to a symbol from the alphabet of symbols that provides the representation of the information for identifier for the given dimension. For example, in OLC, the alphabet contains 20 symbols which are mapped to alphanumeric characters. For a three dimensional asset identifier, three characters are used for the string in each layer. For some embodiments described herein, one need not index on all dimensions. For example in three dimensions, it is possible to only index length and width (and not height).

Figure 10:
FIG. 10 is an illustration depicting trie structure for various lengths of length-3 strings from a size-2 alphabet.
Figure 10:
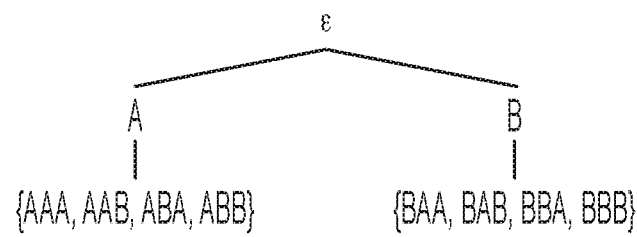
Figure 10:
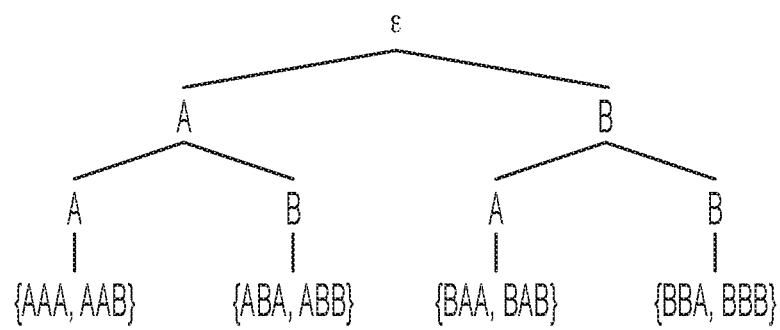
Figure 10:
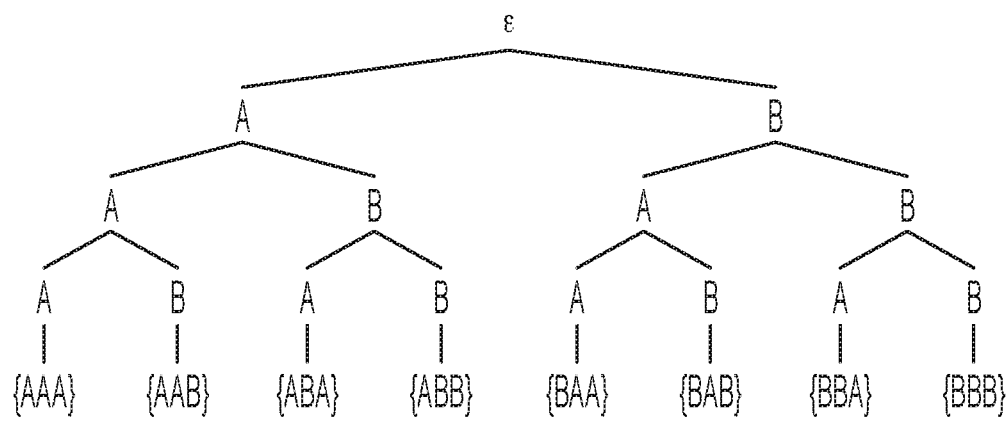

Referring to FIG. 10, a set of length-3 strings from the size-2 alphabet {A, B} is illustrated: "AAA", "AAB", "ABA", "ABB", "BAA", "BAB", "BBA", and "BBB". For each string prefix length, we can construct the corresponding trie.

As used herein, an "insertion" operation receives a trie and a string as input, finds the leaf node for the string, and then stores the string in the leaf node. Given a length-k string that is drawn from a size-n alphabet, the worst-case time complexity for insertion is O(k), since we must make at most k comparisons to find the corresponding leaf node. Note that the size of the alphabet does not affect the worst-case time complexity for the "insertion" operation.

As used herein, a "lookup" operation receives a trie and a string as input, finds the leaf node for the string, and if it exists, returns the stored value(s) of the leaf node. Given a length-k string that is drawn from a size-n alphabet, the worst-case time complexity for lookup is O(k), since we must make at most k comparisons to find the corresponding leaf node. Note that the size of the alphabet does not affect the worst-case time complexity for the "lookup" operation.

Figure 11:
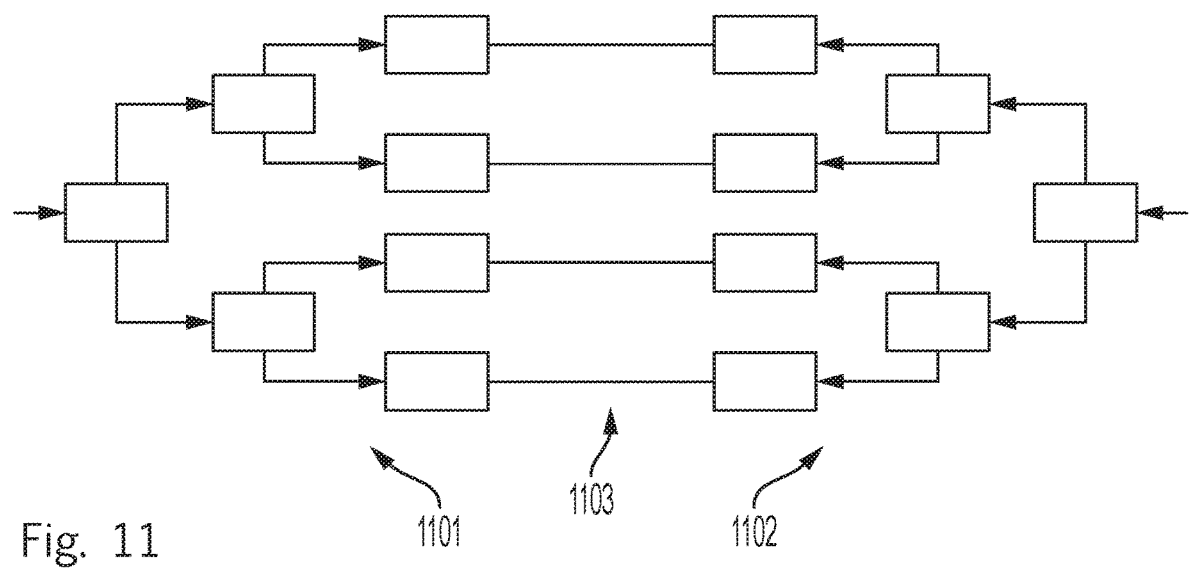
FIG. 11 is an illustration of a zip operation for two trie structures.
Figure 12:
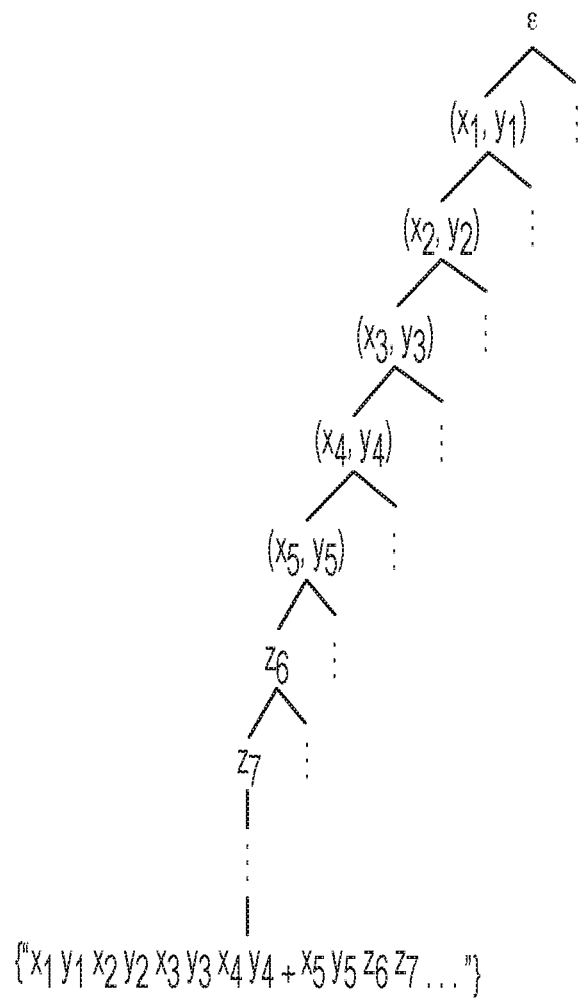
FIG. 12 is an illustration depicting a trie for an arbitrary string that is prefixed by an arbitrary Open Location Code.

Referring to FIG. 11, an illustration depicts a merging/comparison of two trie structures. The "zip" operation receives a pair of first and second indexed trie data structures 1101, 1102 and returns a new data structure whose value(s) are paired at the common indices 1103. Merging, or zipping, can be spatially, spatiotemporally, and/or categorically based. Embodiments described herein leverage the fact that the result of "zipping" is the identification of pairs of trie nodes that correspond to indexed strings that lie within the same vicinity of the abstract n-dimensional space. Values at uncommon indices are discarded. Consider the following pair of lists:

[a, b, c, d] and [α, β]

The lists can be rewritten as sets of pairs of indices and values:

{(0, a), (1, b), (2, c), (3, d)} and {(0, α), (1, β)}

When "zipped", the resulting set is:

{(0, (a, α)), (1, (b, β))}

Hence, the "zipped" list is:

[(a, α), (b, β)]

The type signature of the "zip" operation is:

mx×my→m(x,y)

where m is the container type (e.g., list and trie) and x and y are the value types. The "zip" operation is a special case of the higher-order "zip with" operation, which, in addition to the two indexed data structures, receives a binary function (e.g., pairing). The type signature of the "zip with" operation is:

(x×y→z)×mx×my→mz where z is the value type. Given two tries of length-k strings that are drawn from the same size-n alphabet, the worst-case time complexity for zipping is $O(2 \times n^k) = O(n^k)$, since we must traverse every node of both tries.

Example of Cross-Referencing Sets Each Comprising Two-Dimensional Asset Identifiers For two-dimensional asset identifiers based on a grid system comprising the Open Location Code (OLC), the trie data structure is constructed by considering the OLC component up to a given string prefix length.

Figure 13:
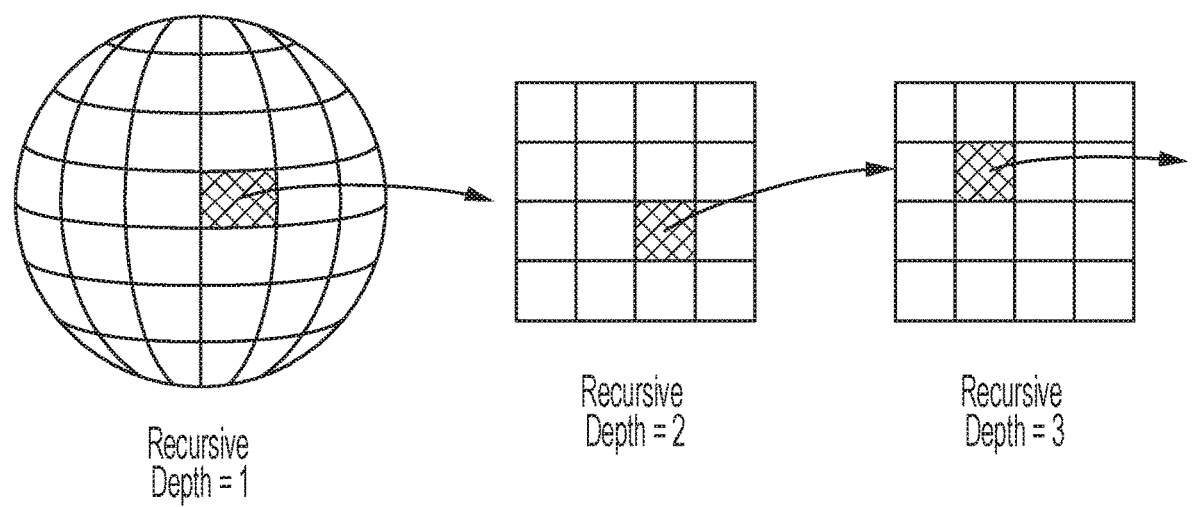
FIG. 13 is a depiction of OLC encoding by successive identification of OLC grid cells for each recursion depth.

An OLC is a string of the form: "$x_1 y_1 x_2 y_2 x_3 y_3 x_4 y_4 + x_5 y_5 z_6 z_7 \ldots$", where $x_d$ and $y_d$ are "pair codes", $z_d$ are "refinement codes", and d is the depth of the recursion for the OLC encoding operation. Hence, an OLC may be represented as a pair of lists: [$(x_1, y_1), (x_2, y_2), (x_3, y_3), (x_4, y_4), (x_5, y_5)$] and [$z_6, z_7, \ldots$]. Represented thus, we can construct the trie for an arbitrary string (depicted in FIG. 13) that is prefixed by an arbitrary OLC.

In some embodiments, we do not construct the trie using the entire identifier string, since each component corresponds to a recursion depth for the encoding operation, which corresponds to an OLC grid resolution (depicted in FIG. 14). FIG. 14 is an illustration depicting a trie for an arbitrary string that is prefixed by an arbitrary OLC. In practice, the recursion depth is selected such that the corresponding insertion, lookup and zip operations are accurate to a given OLC grid resolution (e.g., depth-4, which corresponds to 14 m×14 m OLC grid cells).

The alphabet for OLCs is size-20. Hence, the size of the alphabet for pair codes is $20^2=400$ and the size of the alphabet for refinement codes is $20^1=20$. Therefore, at a given depth of recursion for the OLC encoding operation, the branching factor for the corresponding level of the trie is:

$$\text{Branches}(d) = \begin{cases} 400 & \text{if } d \leq 5 \\ 20 & \text{if } d > 5 \end{cases}$$

Therefore, at a given depth of recursion for the OLC encoding operation, the total number of OLCs at the corresponding level of the trie is:

$$\text{Count}(d) = \prod_{i=1}^{d} \text{Branches}(i) = \begin{cases} 400^d & \text{if } d \leq 5 \\ 400^5 \times 20^{(d-5)} & \text{if } d > 5 \end{cases}$$

For example, for length-11 OLCs, the depth of recursion is 6, and therefore, the total number of length-11 OLCs is Count(6)=204800000000000 (over 204 trillion!!).

Suppose that we are asked to cross-reference a pair of sets of length-11 OLCs, referred to as the "left" and "right" sets. The first naive approach is to take the Cartesian product of the left and right sets and then to apply the cross-reference test to each pair of OLCs (one OLC from the left set and one OLC from the right set). The worst-case time complexity for the Cartesian product is O(l×r), where l is the cardinality of the left set and r is the cardinality of the right set. Clearly, for large sets, the computational cost of the first naive approach quickly becomes prohibitively expensive. Moreover, many of the cross-reference tests are redundant, since it is highly unlikely that any two OLCs chosen at random will lie within the same OLC grid cell. Now consider the average time complexity for the first naive approach. Irrespective of the cardinalities of the left and right sets, the average time complexity for the Cartesian product remains O(l×r), since we must still apply the cross-reference test to each pair of OLCs. The second naive approach is to compute the prefix for each OLC and then to apply the first naive approach to the resulting sets of substrings. However, for obvious reasons, this suffers from the same drawbacks as the first naive approach.

Embodiments described herein construct tries for the left and right sets, to "zip" the pair of tries, and then to take the Cartesian product of each pair of subsets of OLCs at each leaf node (viz., to "zip with" the Cartesian product as the binary function). The intuition for the principled approach is that the trie data structure exploits the geographic information that is encoded by the OLC, whereby OLCs that are geographically close to each other are also indexed close to each other in the corresponding tries, i.e., inserted and looked-up via the same path through the trie. Moreover, the cardinalities of the subsets of OLCs at each leaf node of the trie are, by definition, significantly smaller than the cardinality of the set of all OLCs for a given depth of recursion taken as a whole. Concretely, at the ith level of the trie, the leaf nodes under a given branch node store a total of Count(d)/Count(i) OLCs. Hence, both the worst-case and average time complexities (dominated by the total number of cross-reference tests to be performed) are dramatically reduced, since the cross-reference test need only consider pairs of left and right OLCs that lie within the same OLC grid cell.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A method of cross-referencing different sets of asset identifiers, the method comprising the steps of:

providing first and second data sets comprising records, each record comprising an n-dimensional asset identifier that encodes a center-of-mass position and center-of-mass-to-bounding-polytope extents along n dimensions (n≥2) of a physical asset in a single, non-opaque, computer-readable code string;

constructing first and second trie data structures based on the first and second data sets, respectively, wherein each layer of the trie data structure corresponds with a successive degree of spatial resolution and each leaf node in a layer comprises a subset of n-dimensional asset identifiers co-located in an n-dimensional grid cell;

zipping the first and second trie data structures at a predetermined level of spatial resolution to yield a coproduct of the subsets from a pair of first and second trie-data-structure leaf nodes, the coproduct comprising a list of candidate cross-referenced pairs of records from the first and second data sets;

calculating a spatially-based statistic associated with a predetermined heuristic for the n-dimensional asset identifiers in a pair of nodes; and applying the predetermined heuristic to select a cross-referenced pair of records from the list of candidate cross-referenced pairs wherein calculating the spatially-based statistic further comprises the steps of decoding an n-dimensional asset identifier to yield its center of mass and its center-of-mass-to-bounding-polytope extents, labeling respective asset identifiers in a candidate cross-referenced pair as having either the least or greatest area, and calculating the Euclidean distance between centers of mass for the candidate cross-referenced pair, wherein the predetermined heuristic comprises the pair of n-dimensional asset identifiers for which a percentage area of intersection for bounding boxes with the least area is greatest and for which a distance between two centers of mass is lowest.

2. The method of claim 1, wherein said constructing first and second trie data structures further comprises the step of constructing first and second trie data structures based on a portion of the first and second data sets determined by the predetermined spatial resolution.

3. The method of claim 1, wherein the spatially-based statistic comprises a record-level statistic, a node-level statistic, trie-data-structure level statistic, a data-set-level statistic, or a combination thereof.

4. The method of claim 1, wherein the predetermined heuristic comprises a maximum percentage area of intersection for bounding boxes for a pair of asset identifiers.

5. The method of claim 1, wherein the predetermined heuristic comprises a minimum distance between centers of mass for a pair of asset identifiers.

6. The method of claim 1, wherein the predetermined heuristic comprises one n-dimensional asset identifier contains another.

7. The method of claim 1, further comprising indexing the first data set, the second data set, or both to enhance computational efficiency.

8. The method of claim 1, wherein the first data set, the second data set, or both comprise a delimiter-separated values file or a spatial data format shapefile.

9. The method of claim 1, wherein at least one record further comprises an attribute associated with an asset identifier of the at least one record.

10. The method of claim 9, wherein the attribute comprises asset characteristics, asset description, asset make, asset model, asset ownership, or a combination thereof.

11. The method of claim 1, wherein $n \geq 3$.

12. The method of claim 1, further comprising the step of filtering the records of the first data set, the records of the second data set or both at a record-level, a node-level, a trie-data-structure level, a data-set level, or a combination thereof.

13. The method of claim 1, further comprising the step of filtering members of the list of candidate cross-referenced pairs.

14. A non-transitory computer readable storage medium storing one or more programs, the one or more programs comprising instructions, which are executed by one or more processors to:
provide first and second data sets comprising records, each record comprising an n-dimensional asset identifier that encodes a center-of-mass position and center-of-mass-to-bounding-polytope extents along n dimensions ($n \geq 2$) of a physical asset in a single, non-opaque, computer-readable code string;
construct first and second trie data structures based on the first and second data sets, respectively, wherein each layer of the trie data structure corresponds with a successive degree of spatial resolution and each leaf node in a layer comprises a subset of n-dimensional asset identifiers co-located in an n-dimensional grid cell;
zip the first and second trie data structures at a predetermined level of spatial resolution to yield a coproduct of the subsets from a pair of first and second trie-data-structure leaf nodes, the coproduct comprising a list of candidate cross-referenced pairs of records from the first and second data sets;
calculate a spatially-based statistic associated with a predetermined heuristic for the n-dimensional asset identifiers in a pair of nodes; and
apply the predetermined heuristic to select a cross-referenced pair of records from the list of candidate cross-referenced pairs, wherein the instructions, which are executed to calculate the spatially-based statistic, further comprise instructions, which are executed to:
decode an n-dimensional asset identifier to yield its center of mass and its center-of-mass-to-bounding-polytope extents;
label respective asset identifiers in a candidate cross-referenced pair as having either the least or greatest area; and
calculate the Euclidean distance between centers of mass for the candidate cross-referenced pair;
wherein the predetermined heuristic comprises the pair of n-dimensional asset identifiers for which a percentage area of intersection for bounding boxes with the least area is greatest and for which a distance between two centers of mass is lowest.

15. The non-transitory computer-readable storage medium of claim 14, wherein the instructions, which are executed to construct first and second trie data structures, further comprise instructions, which are executed to construct first and second trie data structures based on a portion of the first and second data sets determined by the predetermined spatial resolution.

16. The non-transitory computer readable storage medium of claim 14, storing programs comprising instructions, which are executed to further:
filter the records of the first data set, the records of the second data set or both at a record-level, a node-level, a trie-data-structure level, a data-set level, or a combination thereof.

* * * * *